United States Patent [19]
Sekimoto et al.

[11] Patent Number: 5,752,233
[45] Date of Patent: May 12, 1998

[54] SYSTEM AND METHOD FOR BUDGET COMPILATION UNDER PARALLEL/ DISTRIBUTED PROCESSING

[75] Inventors: Takao Sekimoto, Kawasaki; Masahiro Sakashita, Yokosuka; Kenji Ando, Yokohama; Mitsushige Tsukada, Yokosuka, all of Japan

[73] Assignee: Hitachi, Ltd., Tokyo, Japan

[21] Appl. No.: 322,413

[22] Filed: Oct. 13, 1994

[30] Foreign Application Priority Data

Oct. 20, 1993 [JP] Japan .................................. 5-262104

[51] Int. Cl.$^6$ ............................................ G06F 13/00
[52] U.S. Cl. .................................... 705/1; 705/30
[58] Field of Search ........................ 364/401, 402, 364/403, 406, 408; 395/670, 200.3; 705/61, 30

[56] References Cited

U.S. PATENT DOCUMENTS

| | | | |
|---|---|---|---|
| 4,937,784 | 6/1990 | Masai et al. | 395/650 |
| 5,107,421 | 4/1992 | Yazima et al. | 364/405 |
| 5,333,280 | 7/1994 | Ishakawa et al. | 395/375 |
| 5,522,070 | 5/1996 | Sumimoto | 395/650 |
| 5,530,880 | 6/1996 | Katsurabayashi | 395/800 |

FOREIGN PATENT DOCUMENTS

A-112057  4/1990  Japan .

OTHER PUBLICATIONS katzan, "Distributed Information Systems", Petrocelli Books, Inc., Chs 1, 4, & 8. 1979.
Hannan, Distributed Processing Management, Auerbach Publishers, Ch. 2. 1982.
Bradley Johnson, CD Catalog Eyes Mail Order PC's: Former Ziff Exec Betting People Will Buy Other Products as Well, Advertising Age, p. 21.

*Primary Examiner*—Gail O. Hayes
*Assistant Examiner*—Phillip Groutt
*Attorney, Agent, or Firm*—Antonelli, Terry, Stout, & Kraus, LLP

[57] ABSTRACT

A budget compilation process for executing budget compilation for a plurality of bank branch offices is executed in parallel at the same time. Process conditions (participant clients in the budget compilation process, and etc.) are inputted to an input/output control unit, and in accordance with the process conditions, a data server starts up a client to execute the budget compilation process. By referring to a scheduling file formed by a budget compilation process start-up unit, the client determines a branch office for which the budget compilation process is executed. In this manner, clients execute the budget compilation process for the subject branch offices in parallel at the same time. The execution state of the budget compilation process can be monitored on a display screen, and an operator can instruct to stop the operation of the whole network at the intermediate of the operation.

15 Claims, 9 Drawing Sheets

| BRANCH OFFICE CODE (F5-1) | STATUS FLAG (F5-2) | WORK STATION NAME (F5-3) |
|---|---|---|
| 001 | 0 | WS1 |
| 002 | 0 | WS2 |
| 003 | 0 | WS3 |
| 004 | 0 | |
| ⋮ | ⋮ | ⋮ |

STATUS FLAG '0' ⋯ BUDGET COMPILATION STILL NOT COMPLETED
STATUS FLAG '1' ⋯ BUDGET COMPILATION UNDER EXECUTION
STATUS FLAG '2' ⋯ BUDGET COMPILATION COMPLETED
STATUS FLAG '*' ⋯ ERROR DURING EXECUTION OF BUDGET COMPILATION
STATUS FLAG '$' ⋯ STOP FLAG SET

FIG.6

| WORK STATION NAME (F6-1) |
|---|
| WS1 |
| WS2 |
| WS3 |
| WS4 |
| ⋮ |

| BRANCH OFFICE CODE | STATUS FLAG | WORK STATION NAME |
|---|---|---|
| 001 | 1 | WS1 |
| 002 | 1 | WS2 |
| 003 | 2 | WS3 |
| 004 | 0 | |
| ⋮ | ⋮ | ⋮ |

F5-1, F5-2, F5-3

STATUS FLAG '0'  ⋯ BUDGET COMPILATION STILL NOT COMPLETED
STATUS FLAG '1'  ⋯ BUDGET COMPILATION UNDER EXECUTION
STATUS FLAG '2'  ⋯ BUDGET COMPILATION COMPLETED
STATUS FLAG '*'  ⋯ ERROR DURING EXECUTION OF BUDGET COMPILATION
STATUS FLAG '$'  ⋯ STOP FLAG SET

SYSTEM AND METHOD FOR BUDGET COMPILATION UNDER PARALLEL/ DISTRIBUTED PROCESSING

BACKGROUND OF THE INVENTION

1. Field of the Invention

The present invention relates to a budget compilation system and method for use with bank branch offices.

A conventional budget compilation system uses a host system or a single work station to compile budgets of all branch offices of a bank. As a general parallel/distributed processing system, the concept of a "task broker" has been introduced, as described in "Foremost of Distributed Computing Environments" in a special issue of "Nikkei Electronics" (published by Nikkei BP), at pp. 130 to 138, Jun. 11, 1990. The task broker is a tool for automatically selecting an optimum machine suitable for executing an application and asking the machine to perform data processing. A machine is selected in accordance with a selection criterion called an "affinity". An affinity is a numerical value representative of the "compatibility" between a machine and an application. This value is set directly by an operator or by a program written by an operator.

The concept of a "task broker" has, however, disadvantage in that the basis of determining an affinity is indefinite. An affinity value is set to an optional value by a user, or to a value determined by a user program. It is not easy to write a program for determining an affinity value and selecting an optimum machine by taking into consideration various parameters, such as a CPU load and memory use amount, when executing an application and a memory usage condition and CPU load of the machine.

For the above reason, one CPU of a host computer or a work station in a conventional budget compilation system compiles the budgets of all branch offices. It takes a lot of processing time if the number of branch offices is large.

SUMMARY OF THE INVENTION

It is an object of the present invention to provide a system and method for budget compilation under parallel/distributed processing wherein a plurality of work stations are connected to a network to perform parallel processing and reduce the CPU load, with the result that the processing time required for the budget compilation of all branch offices is shortened approximately to the processing time divided by the number of work stations connected to the network.

The budget compilation system of the invention is configured by a server and a plurality of clients. The server has a file for storing the codes of branch offices for which budget compilation is to be performed and the names of clients which are to execute the budget compilation process, and means for activating a client to execute the budget compilation process by referring to the file. Each client executes a part of the budget compilation process and reports the results to the server.

The budget compilation process heretofore conventionally executed by a single CPU, is executed as to the plural branch offices in parallel at the same time by a plurality of work stations so that the total processing time can be shortened to the processing time divided by the number of work stations connected to the network. An operator can confirm on a display screen which work station on the network is presently executing the budget compilation process for which branch office. All data is collectively managed by a single work station (data server) on the network, and all work stations individually refer to and renew the collectively managed data file. Accordingly, the maintenance of data is easy. In allocating each work station for the budget compilation process to each branch office, an operator is not required to set a judgement criterion for selecting work stations, such as an "affinity" as used by the above-described "task broker", but the system automatically allocates work stations. According to the present invention, a work station having the most excellent performance, i.e., a work station which has completed the budget compilation process for a subject branch office earliest, can execute the budget compilation process for another standby branch office. As a result, the work station having an excellent performance can execute the budget compilation process for a larger number of branch offices, and the budget compilation process for each branch office can be allocated to a proper CPU. Furthermore, for example, if it takes two days for executing the budget compilation process for all branch offices, a stop flag input unit of the invention can receive an intermediate stop instruction from an operator. Accordingly, the budget compilation process for a half of all the branch offices may be executed on the first day, and that for the remaining branch offices then can be executed on the second day, providing ease of use of the system.

Furthermore, an operator can select a branch office for which the budget compilation is to be performed. It is therefore convenient to deal with, for example, a case wherein only typical branch offices are desired to be subjected to budget compilation. Still further, an operator can select a work station participating in the parallel processing, at each time the budget compilation process is executed. Accordingly, it is convenient to deal with, for example, a case wherein a work station already used by a process other than the budget compilation process is called upon to participate in the budget compilation process.

A file is formed for scheduling work stations on the network, and the budget compilation process is started thereafter at each work station to enable the parallel processing. Each work station on the network accesses the scheduling file under its operation environments, and retrieves the code of a branch office which has still not completed the budget compilation process. As a result, it becomes possible to prevent a plurality of CPUs from executing the budget compilation process for the same branch office at the same time, while realizing an efficient allocation of CPUs of the whole network.

An intermediate stop instruction entered by an operator can be accepted so that budget compilation can be performed divisionally a plurality of times, providing ease of use of the system.

According to the present invention, the budget compilation process conventionally executed by a single CPU is executed in parallel as to plural branch offices at the same time by a plurality of CPUS, thereby shortening the processing time to the processing time divided by the number of work stations connected to the network.

DESCRIPTION OF THE PREFERRED EMBODIMENT

An embodiment of the invention will be described with reference to the accompanying drawings.

Figure 1A:
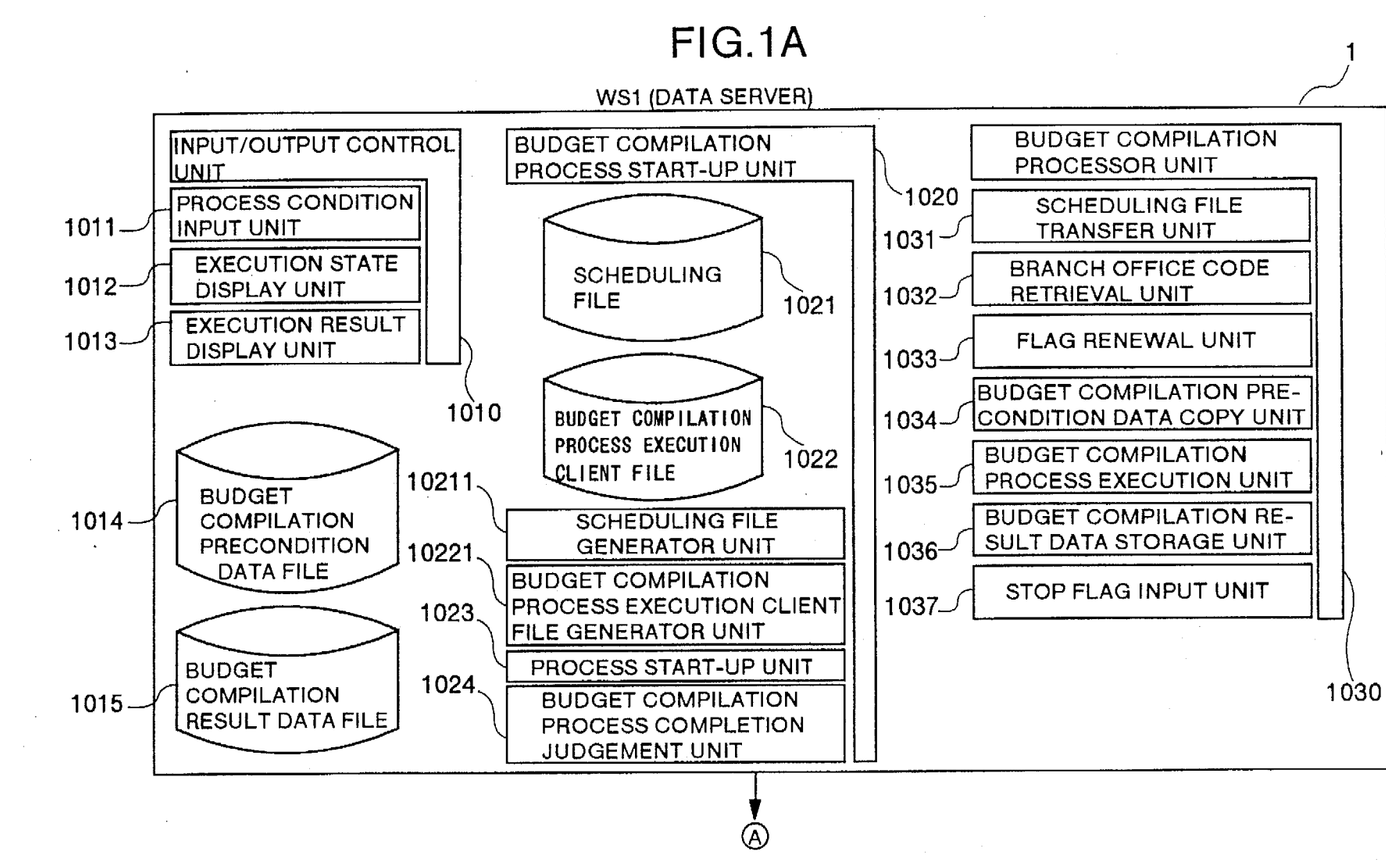
FIGS. 1A and 1B are block diagrams of a budget compilation system of the invention.
Figure 1B:
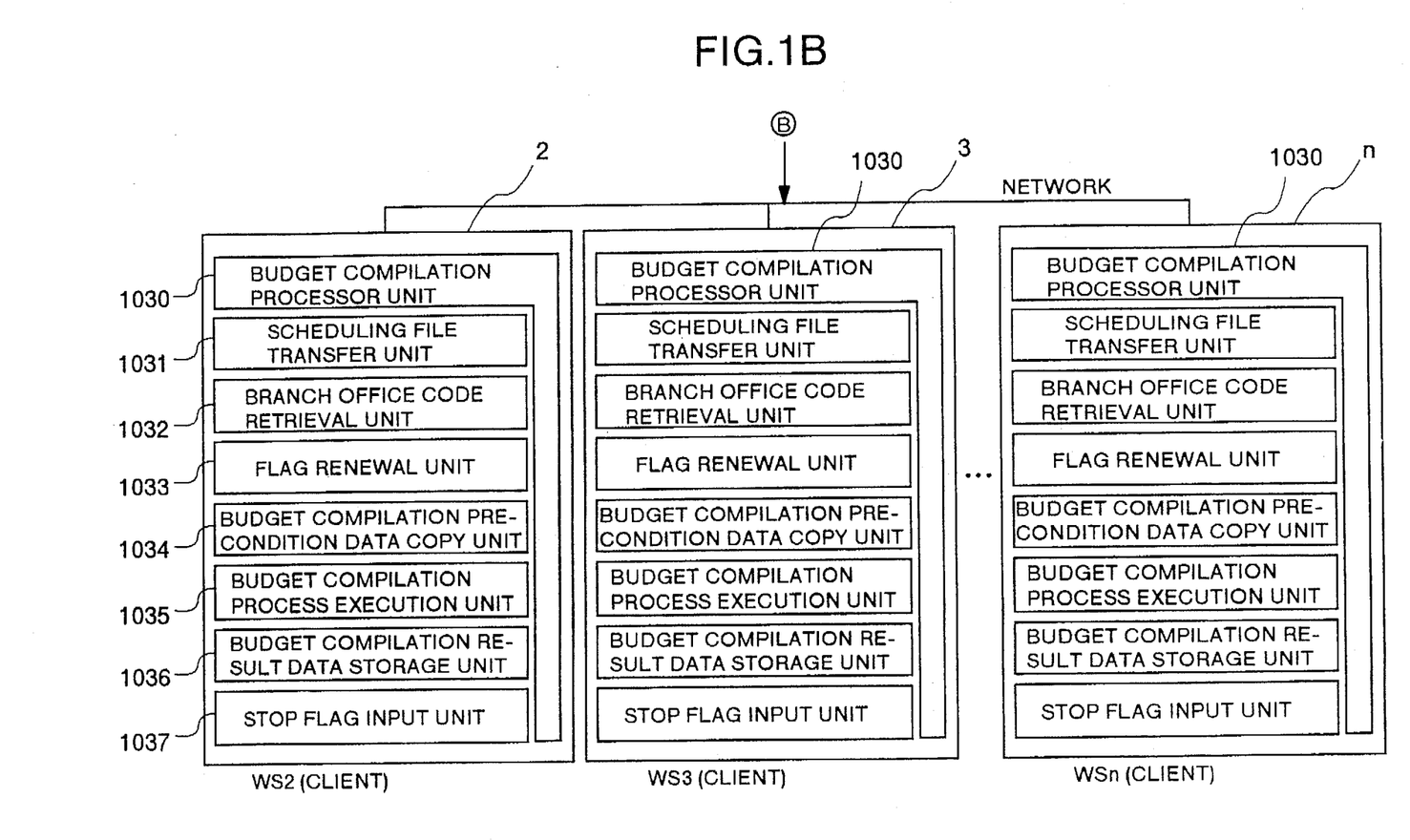

FIGS. 1A and 1B are block diagrams showing a budget compilation system under parallel/distributed processing. A work station 1 operating as a data server is connected via a network to work stations 2, 3, ..., n operating as clients. An input/output control unit 1010 of the work station 1 is constituted by a process condition input unit 1011, an execution state display unit 1012, and an execution result display unit 1013. The process condition input unit 1011 receives the codes of branch offices for which budget compilation is to be performed and receives the names of work stations 1, 2, 3, ..., n on the network at which a budget compilation process for the plural branch offices is executed in parallel. The execution state display unit 1012 displays an indication as to which work station is executing the budget compilation process for which branch office. The execution result display unit 1013 displays the execution results of the budget compilation process after the budget compilation process for all designated branch offices have been completed. A budget compilation precondition data file 1014 stores budget compilation precondition data for each branch office. A budget compilation result data file 1015 stores the execution results of the budget compilation process.

A budget compilation process start-up unit 1020 is constituted by a scheduling file generator unit 10211, a process start-up unit 1023, a budget compilation process completion judgement unit 1024, a budget compilation process execution client file 1022, and a client file generator unit 10221. The scheduling file generator unit 10211 generates a scheduling file 1021 which stores a list of branch offices designated for the budget compilation process by the process condition input unit 1011. The process start-up unit 1023 requests a work station designated by the process condition input unit 1011 to perform the budget compilation process. The budget compilation process completion judgement unit 1024 judges whether the budget compilation process for all designated branch offices has been completed. The budget compilation process execution client file 1022 stores the names of work stations executing the budget compilation process. The client file generator unit 10221 generates this file 1022.

A budget compilation processor unit 1030 is constituted by a scheduling file transfer unit 1031, a branch office code retrieval unit 1032, a flag renewal unit 1033, a budget compilation precondition data copy unit 1034, a budget compilation process execution unit 1035, a budget compilation result data storage unit 1036, and a stop flag input unit 1037. The scheduling file transfer unit 1031 transfers the scheduling file 1021 in the budget compilation process start-up unit 1020 to each work station via the network. The branch office code retrieval unit 1032 retrieves the code of a branch office which has still not completed the budget compilation process from the transferred scheduling file 1021. The flag renewal unit 1033 writes a status flag indicating that the budget compilation process is under execution in the scheduling file 1021. The budget compilation precondition data, copy unit 1034 copies data such as actual transaction values of a branch office for which the budget compilation process is executed, from the budget compilation precondition data file 1014 via the network. The budget compilation process execution unit 1035 executes the budget compilation process in accordance with data copied by the budget compilation precondition data copy unit 1034. The budget compilation result data storage unit 1036 stores the budget compilation process execution results in the budget compilation result data file 1015 via the network. The stop flag input unit 1037 receives and holds a stop instruction of the budget compilation process under execution at each or all work stations on the network.

As shown in FIGS. 1A and 1B, the work station 1 has the input/output control unit 1010, budget compilation process start-up unit 1020, budget compilation precondition data file 1014, budget compilation result data file 1015, and a budget compilation processor unit 1030, and the other work stations (n=2, 3, ...) have only the budget compilation processor unit 1030. In the following, the work station 1 is called a "data server", and the other work stations n (n=2, 3, ...) are called a "client". The work station 1 runs both as a data server and as a client.

Figure 2:
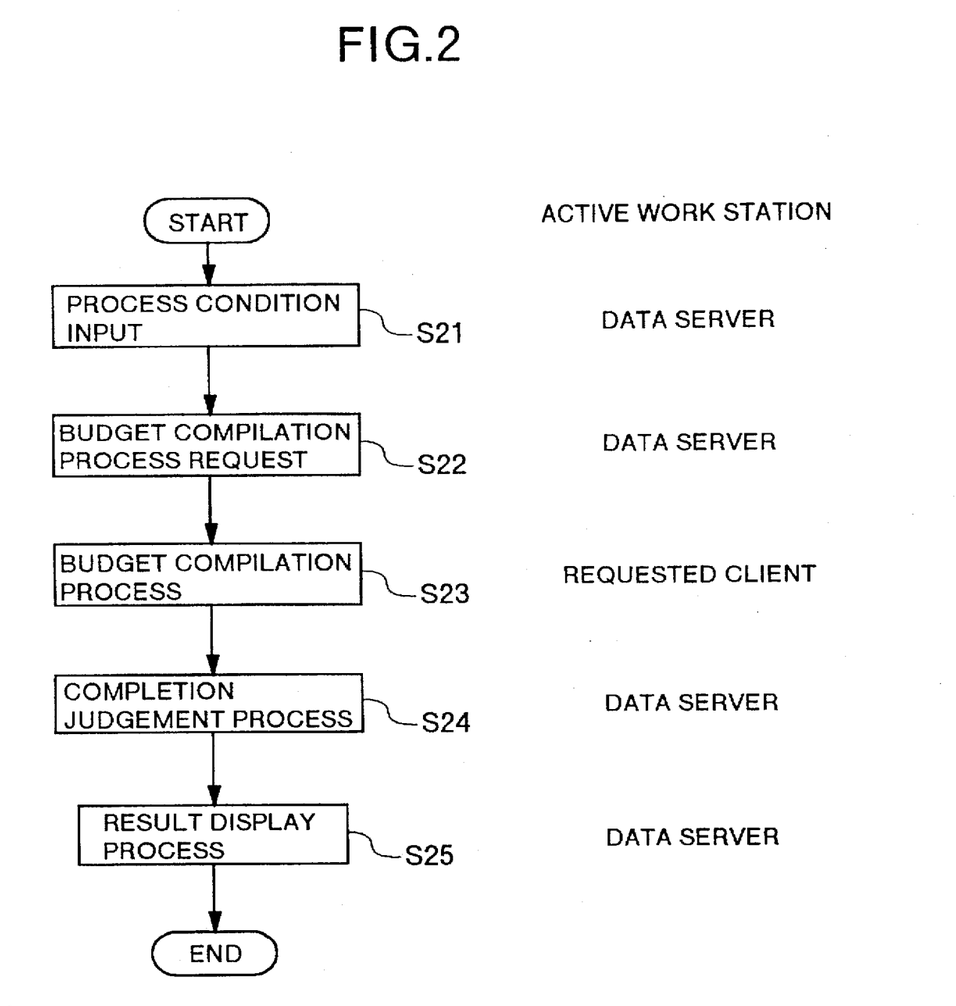
FIG. 2 is a flow chart explaining the outline of budget compilation of the invention.

FIG. 2 is a flow chart explaining the operation of the whole system. At Step S21, the data server receives a process condition input from an operator. Step S21 is executed by the input/output control unit 1011. At Step S22, the data server requests each client to perform the budget compilation process. Step S22 is executed by the budget compilation process start-up unit 1020. At Step S23, the budget compilation process is executed in parallel at the same time by the budget compilation processor units 1030 of the data server and each client. At Step S24, it is judged whether the budget compilation process for all branch offices designated at Step S21 have been completed. At Step S25, the budget compilation process results are displayed in the form of account books. Step S25 is executed by the input/output control unit 1010 of the data server.

Figure 3:
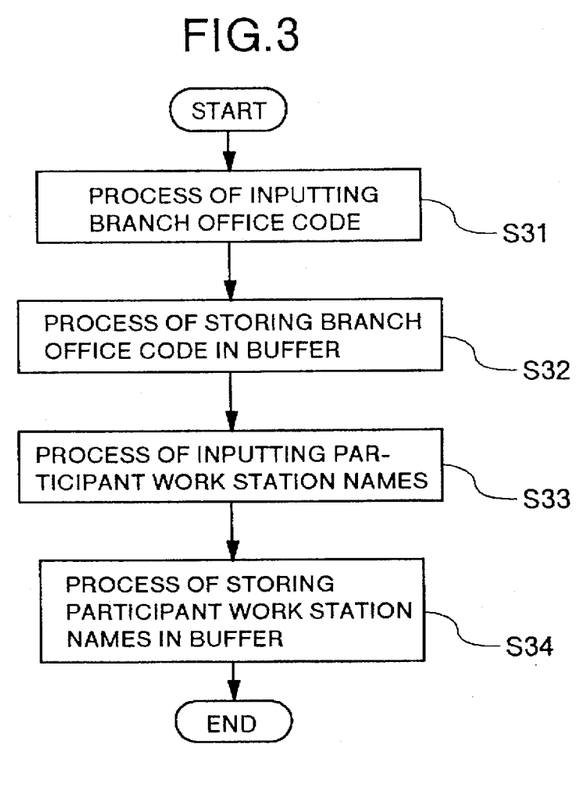
FIG. 3 is a flow chart explaining a process condition input process of the invention.

FIG. 3 is a flow chart explaining the operation at Step S21 of the process condition input shown in FIG. 2. At Step S31, the codes of branch offices for which the budget compilation process is to be executed is entered from a client. At Step S32, the codes (identifier) of the subject branch offices designated at Step S31 are stored in a buffer of the data server. At Step S33, an operator selects work stations to participate in the budget compilation process, from a plurality of clients, and enters the information on the selected work stations. At Step S34, the names (identifiers) of the work stations selected at Step S33 to participate the budget compilation process are stored in a buffer of the data server.

Figure 4:
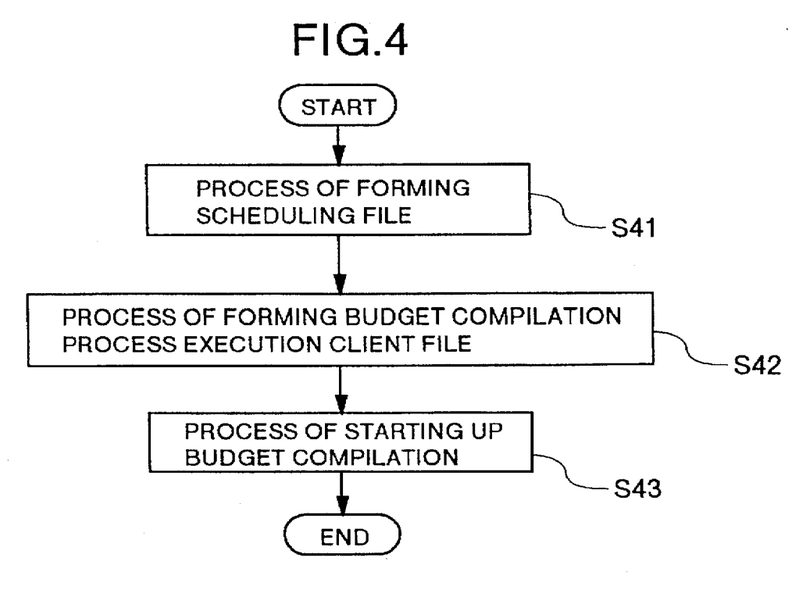
FIG. 4 is a flow chart explaining a budget compilation process start-up process of the invention.
Figure 5:
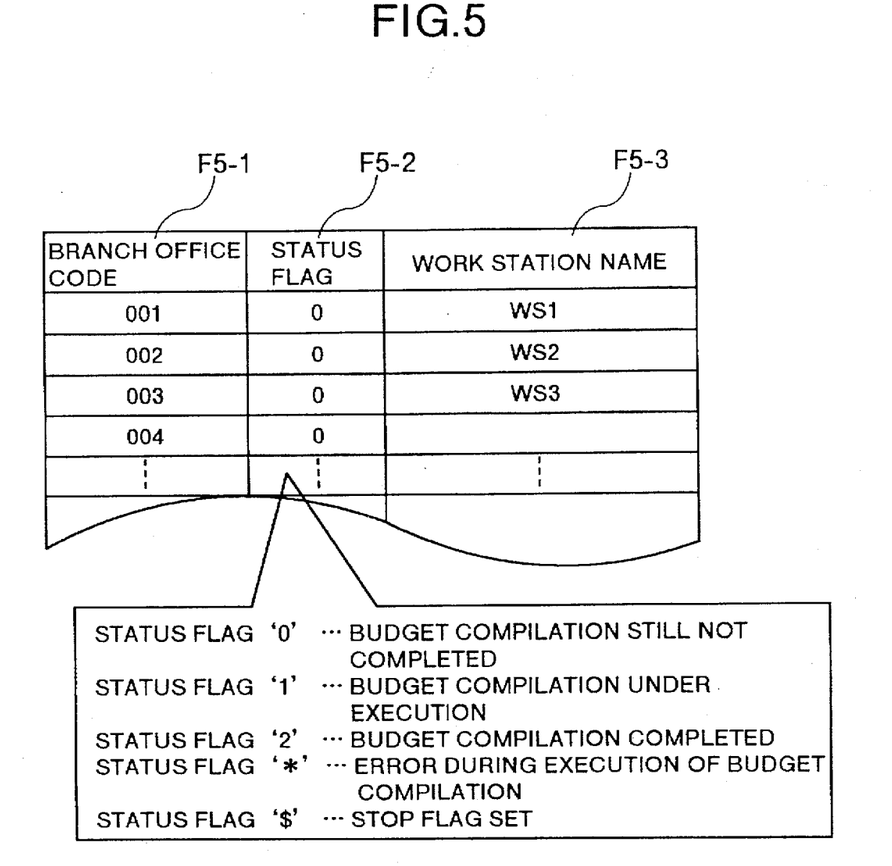
FIG. 5 is a diagram showing the initial state of a scheduling file 1021.

FIG. 4 is a flow chart explaining the operation at Step S22 of the budget compilation process request. At Step S41, the scheduling file 1021 such as shown in FIG. 5 is formed by reading all participant branch office names stored in the buffer at Step S32. Step S41 is executed by the scheduling file generator unit 10211.

Figure 6:
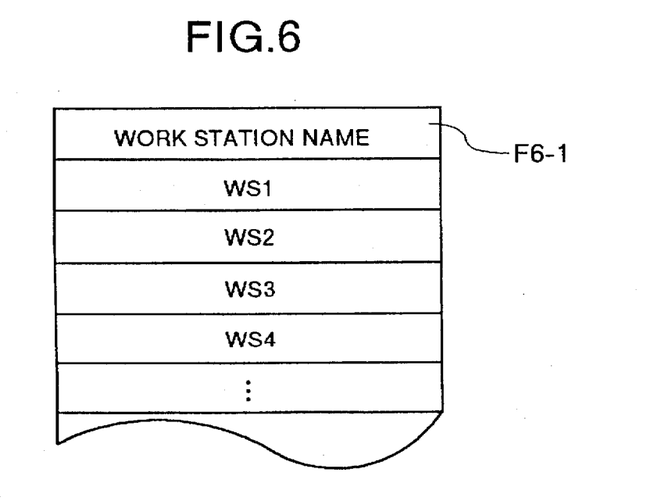
FIG. 6 is a diagram which shows the structure of a budget compilation process execution client file 1022.

FIG. 5 shows an initial state of the scheduling file 1021 formed by the scheduling file generator unit 10211 by reading the names of all participant branch offices stored in the buffer at Step S32. In the initial state, all status flags F5-2 are "0" indicating that the budget compilation process has still not been completed, and the participant work station names F5-3 are made blank. At S42 in FIG. 4, the budget compilation process execution client file 1022 such as shown in FIG. 6 is formed by reading all participant work station names stored at Step S34 shown in FIG. 3 from the buffer. Step S42 is executed by the budget compilation process execution client file generator unit 10221. At Step S43, all clients registered in the budget compilation process execution client file 1022 are requested to execute a procedure shown in the flow charts of FIGS. 7 and 8 by calling a remote procedure call (RPC) function via the network.

Figure 7:
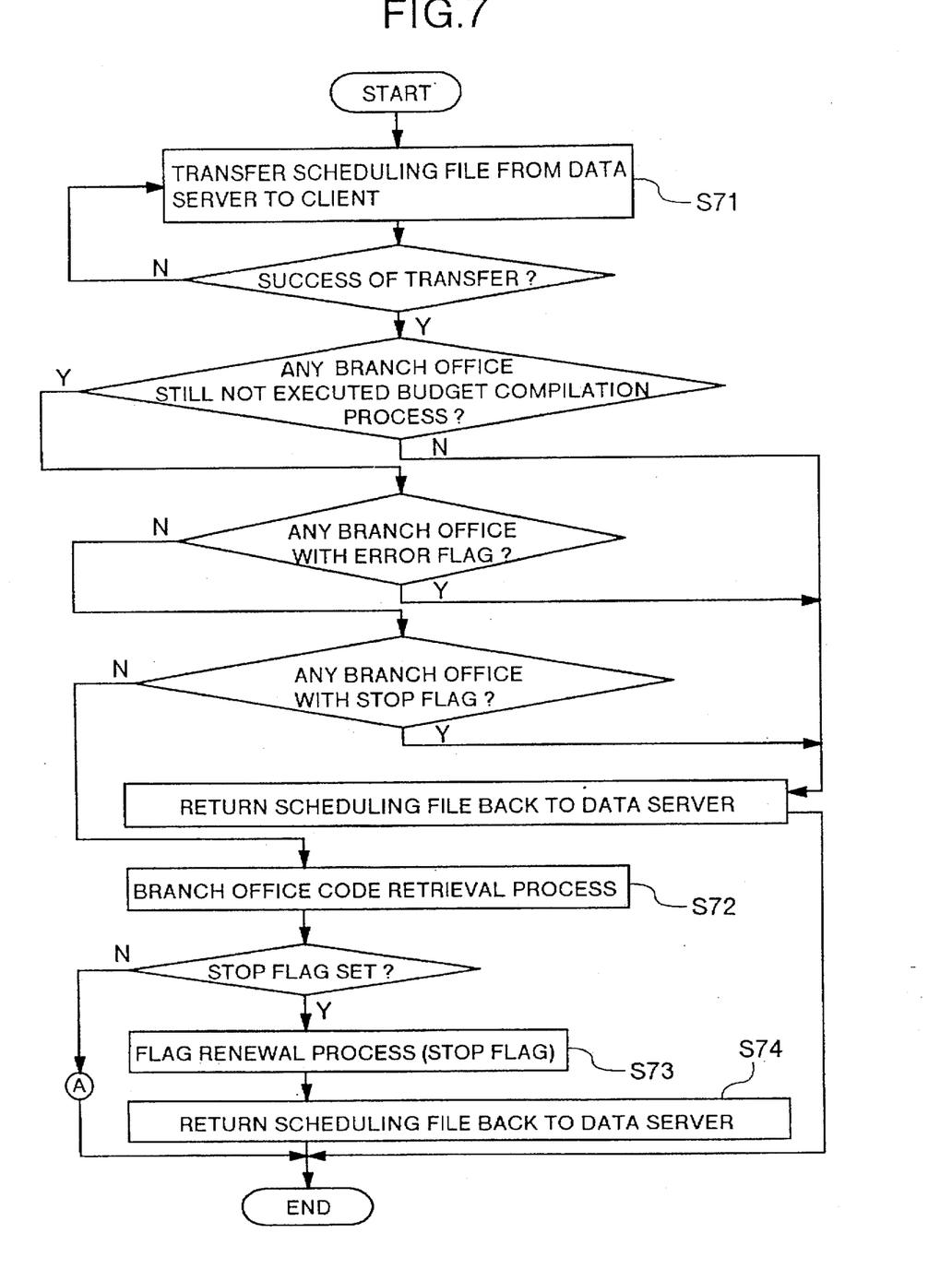
FIG. 7 is a flow chart explaining a budget compilation process of the invention.
Figure 8:
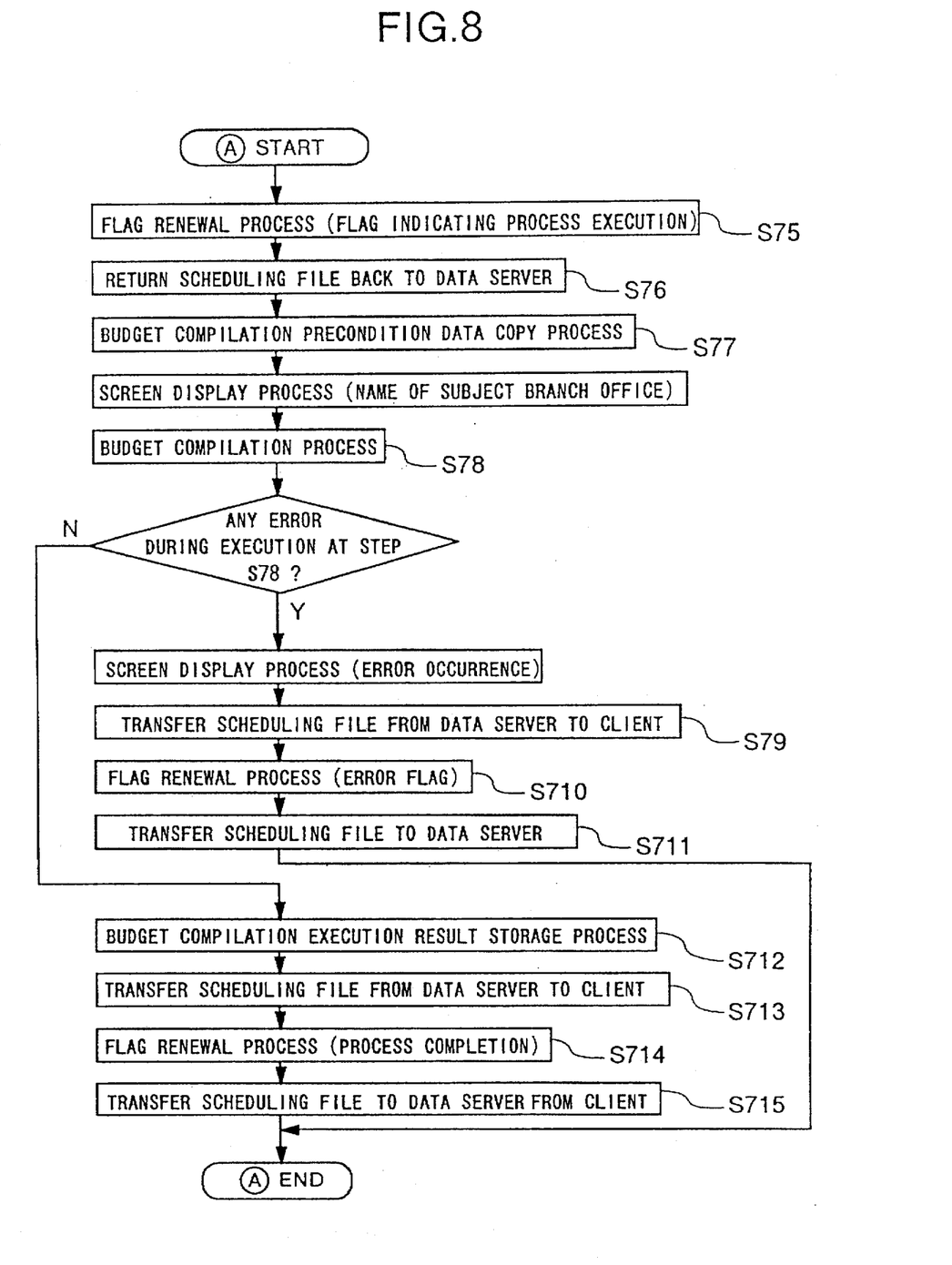
FIG. 8 is a flow chart continued from the flow chart of FIG. 7, explaining the budget compilation process of the invention.
Figure 10:
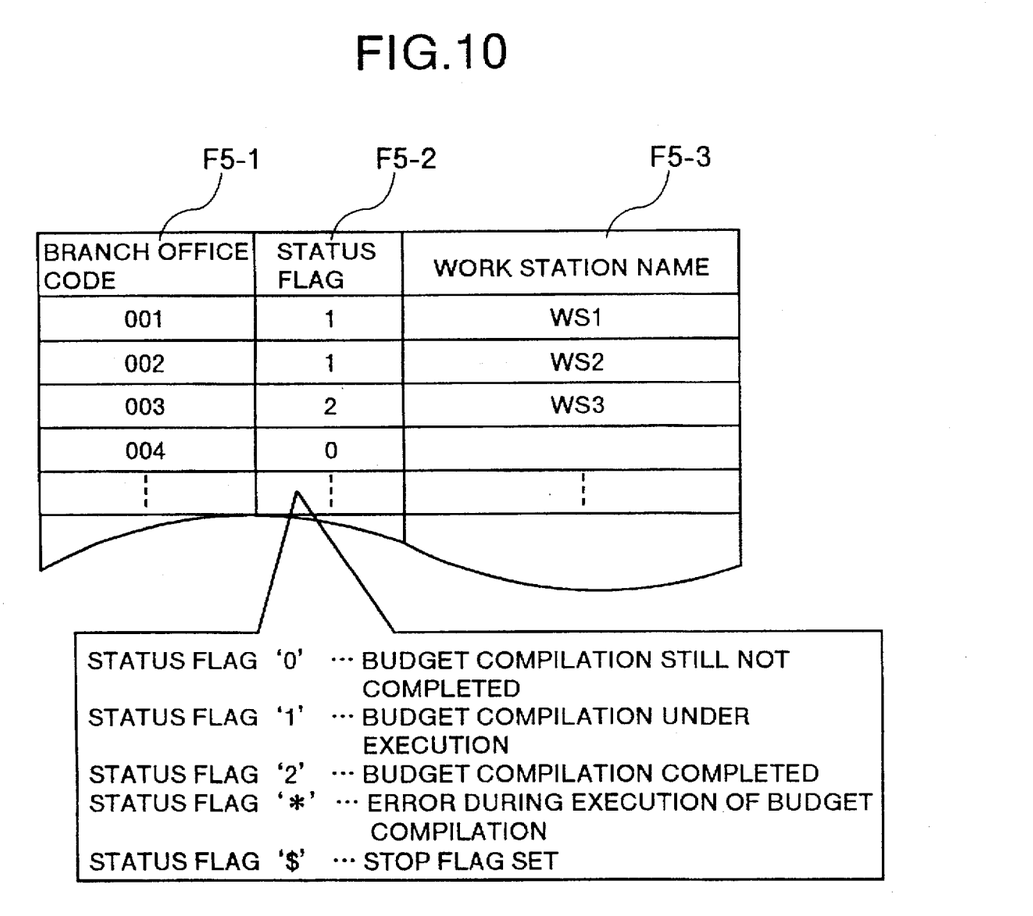
FIG. 10 is a diagram which shows the contents of the scheduling file 1021 during compilation.

FIGS. 7 and 8 are flow charts explaining the operation of the budget compilation process shown in FIG. 2 at Step S23. FIG. 10 shows the contents of the scheduling file 1021 during compilation. In the example shown in FIG. 10, there are branch offices already executing the budget compilation process and a branch office which has completed the budget compilation process, the budget compilation process being or having been executed by the work stations W51–W53 identified at the work station name column F5-3, and a branch office which has still not completed the budget compilation process. At Step S71 shown in FIG. 7, the scheduling file 1021 formed at Step S41 shown in FIG. 4 is transferred from the data server 1 to the budget compilation processor unit 1030 of each client. Step S71 is executed by the scheduling file transfer unit 1031. If another work station is using the scheduling file 1021, Step S71 is retried until the file transfer succeeds. In the case of a success, the status flag F5-2 of the scheduling file is referred to, and if there is no branch office (with the status flag of "0") which has still not completed the budget compilation process, if there is any branch office (with status flag of "*") having generated an error during the budget compilation process, or if there is any branch office (with status flag of "$") with a stop flag set, then the scheduling file transfer unit 1031 returns the scheduling file 1021 from the client back to the data server to terminate the budget compilation process. On the other hand, if it is found from the status flag column F5-2 of the scheduling file 1021 that there is a branch office which has still not completed the budget compilation process and there is no error flag and stop flag set in the scheduling file 1021 (as in the case of the scheduling file 1021 shown in FIG. 10), the branch office code retrieval unit 1032 in that client server retrieves at Step 72 the code of the branch office (branch office code 004 shown in FIG. 10) which has still not completed the budget compilation process. Then, it is checked whether a stop flag "$" has been written in the stop flag input unit 1037. If written, the flag renewal unit 1033 writes "$" in the status flag F5-2 for the branch office intended to execute the budget compilation process, i.e, the branch office identified by Step S72, and writes the name of the work station at which the budget compilation process for the branch office is to be executed, in the work station name column F5-3. Thereafter, the scheduling file 1021 renewed at Step S73 is transferred back to the data server at Step S74. On the other hand, if the stop flag "$" is not written in the stop flag input unit 1037, the flag renewal unit 1033 writes, at Step S75 (shown in FIG. 8) a status flag "1" indicating that the branch office identified at Step S72 is under execution of the budget compilation process and the name of a work station at which the budget compilation process for the branch office is to be executed, in the scheduling file 1021 respectively as the status flag F5-2 and work station name F5-3. At Step S76, the scheduling file 1021 renewed at Step S75 is returned back to the data server. Step S76 is executed by the scheduling file transfer unit 1031. At Step S77, precondition data necessary for the budget compilation process for the branch office identified at Step S72 is copied from the data server by using the code of the branch office as a copy key. Step S77 is executed by the budget compilation precondition data copy unit 1034. At the same time, the budget compilation process execution unit 1035 activates the execution state display unit 1012 on the data server side via the network to display an indication as to which branch office the budget compilation process is being executed at its work station. At Step S78, the budget compilation process is executed in accordance with the precondition data copied at Step S77. Step S78 is executed by the budget compilation process execution unit 1035. When the budget compilation process at Step S78 is normally completed, the execution results of the budget compilation process are stored at Step S712 in the budget compilation result data file 1015. Step S712 is executed by the budget compilation result storage unit 1036. Thereafter, the scheduling file 1021 is transferred from the data server to the client at Step S713. At Step S714, a status flag "2" indicating a completion of the budget compilation process for the branch office is written in the scheduling file 1021 transferred at Step S713 as the status flag F5-2. Step S714 is executed by the flag renewal unit 1033. At Step S715, the scheduling file 1021 written with the flag "2" at Step S714 is returned back to the data server. Step S715 is executed by the scheduling file transfer unit 1031. If an error occurs at Step S78 during the execution of the budget compilation process, the execution state display unit 1012 on the data server side is activated via the network to display an indication that an error has occurred during the budget compilation process for the branch office executed at the subject work station. At Step S79, the scheduling file 1021 is transferred from the data server, and at Step S710 a status flag "*" is written in the status flag column F5-2 at the branch office generated the error. At Step S8711, the scheduling file 1021 written with the status flag "*" at Step S710 is returned back to the data server. Step S711 is executed by the scheduling file transfer unit 1031.

Figure 9:
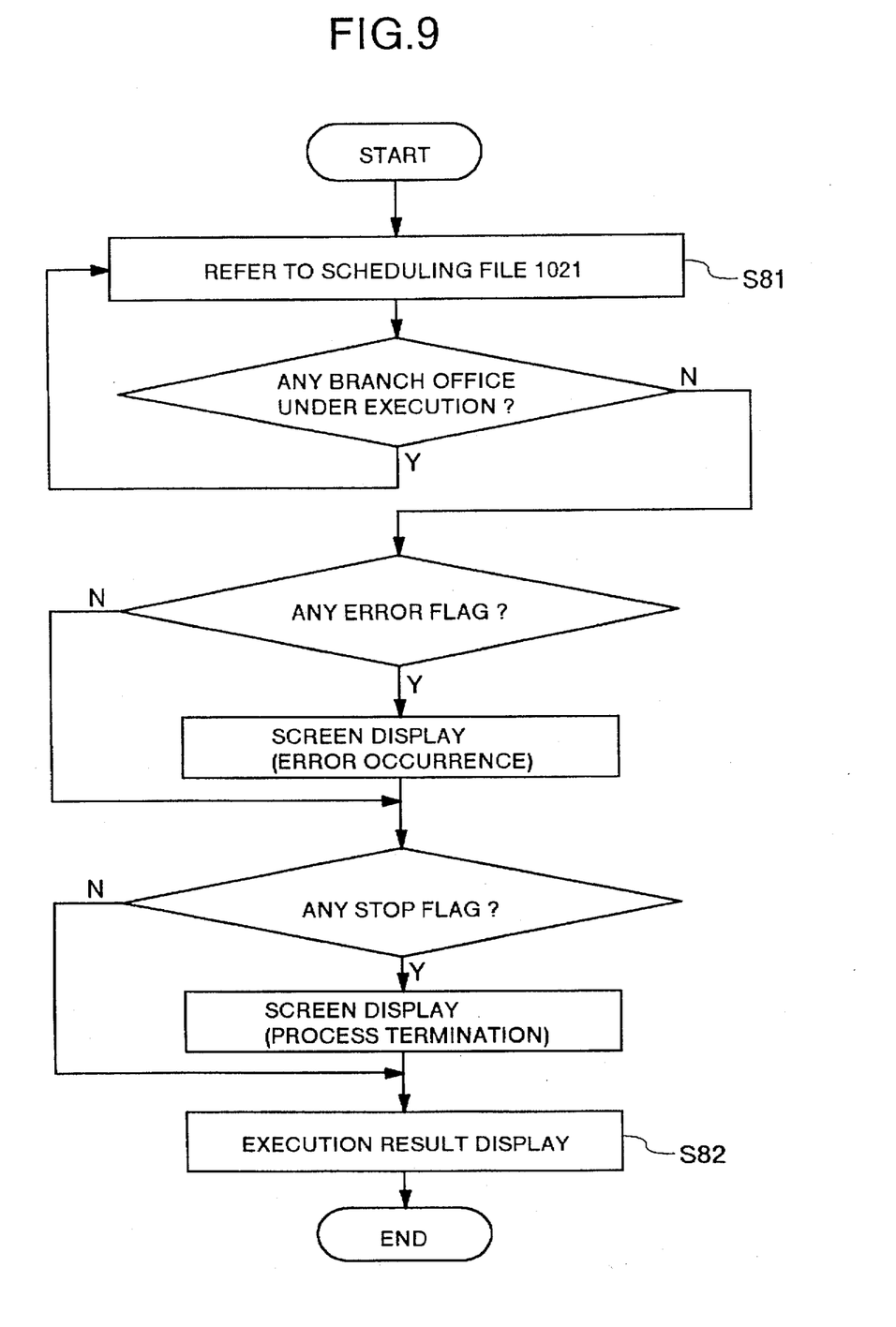
FIG. 9 is a flow chart explaining a completion judgement process and an execution result display process of the invention.

FIG. 9 is a flow chart explaining the operation of the completion judgement process at Step S24 and result display process at Step S25 shown in FIG. 2. At Step S81, the scheduling file 1021 is referred to. If there is no branch office set with a status flag "1" in the scheduling file 1021, the completion judgement process is terminated and the execution result display unit 1013 is activated. The execution result display unit 1013 displays the execution results at Step S82 by referring to the budget compilation result data file 1015. If an error flag or stop flag is set for any branch office during the execution of the budget compilation process, the budget compilation process for the remaining branch offices otherwise to be continued is thereafter stopped and the status flags F5-2 for the branch offices in the scheduling file 1021 are maintained to be "0". Therefore, when the budget compilation process is next executed, only the budget compilation process still not completed for the branch offices is executed.

In transferring the scheduling file 1021 from the client back to the data server, only the changed data in the file may be transferred.

What is claimed is:

1. A budget compilation system for performing budget compilation under distributed environments for branch offices, on a network having a server and a plurality of clients connected thereto, wherein:

(a) said server comprises:
   a budget compilation precondition data file for storing precondition data for each branch office;
   scheduling file forming means for forming a scheduling file storing therein identifiers of said branch offices and status flags corresponding to said identifiers; and
(b) each client comprises:
   scheduling file transferring means for causing said scheduling file to be transferred from said server to said client, and for transferring a renewed scheduling file from said client to said server;
   branch office determining means for determining a branch office for which said client itself is to execute a budget compilation process, on the basis of said identifiers and said status flags in said scheduling file;
   flag renewing means for renewing a status flags corresponding to the branch office thus determined by said branch office determining means, in said scheduling file;
   budget compilation precondition data copying means for copying budget compilation precondition data, corresponding to said branch office thus determined by said branch office determining means, from said budget compilation precondition data file; and
   budget compilation process execution means for executing said budget compilation process in accordance with said copied budget compilation precondition data.

2. A budget compilation system according to claim 1, wherein said client further comprises means for transmitting the execution results of said budget compilation process, and said server further comprises storage means for storing the execution results of said budget compilation process received from said client.

3. A budget compilation system according to claim 1, wherein said client further comprises storage means for storing data obtained as the results of the execution of said budget compilation process by said budget compilation process execution means.

4. A budget compilation system according to claim 1, wherein said client further comprises means for inputting a stop flag in said scheduling file for stopping said budget compilation process at said client.

5. A budget compilation method for a budget compilation system for performing budget compilation under distributed environments for branch offices, on a network having a server and a plurality of clients connected thereto, said method comprising:
   a first step of storing budget compilation precondition data for each branch office in said server;
   a second step of forming a scheduling file comprising identifiers of said branch offices and status flags corresponding to said identifiers in said server;
   a third step of transferring said scheduling file from said server to an activated client;
   a fourth step of determining in said activated client a branch office for which said activated client is to execute a budget compilation process, on the basis of said identifiers and said status flags in said scheduling file;
   a fifth step of renewing in said scheduling file a status flag corresponding to said branch office determined at said fourth step;
   a sixth step of copying budget compilation precondition data corresponding to said branch office determined at said fourth step from said budget compilation precondition data file to said activated client; and
   a seventh step of executing in said activated client a budget compilation in accordance with the contents of said budget compilation precondition data copied at said sixth step.

6. A budget compilation method according to claim 5, further comprising an eighth step of transferring said scheduling file from said server, renewing a status flag of said branch office for which budget compilation was performed, and transferring said renewed scheduling file back to said server.

7. A budget compilation method according to claim 5, further comprising an eighth step of transferring said scheduling file from said server, renewing a status flag of said branch office for which budget compilation was performed, and transferring said renewed scheduling file back to said server, and a ninth step of storing the results of the execution of budget compilation in said client.

8. A budget compilation method according to claim 5, further comprising an eighth step of transferring said scheduling file from said server, renewing a status flag of said branch office for which budget compilation was performed, and transferring said renewed scheduling file back to said server, a ninth step of storing the results of the execution of budget compilation in said client, and a tenth step of transmitting said budget compilation results to said server and said server storing said budget compilation results.

9. A budget compilation method according to claim 5, wherein if a flag indicating a process stop is stored in said scheduling file transferred at said third step, the process by all clients is stopped at said fourth step.

10. A budget compilation method according to claim 5, further comprising an eighth step of displaying an execution state during execution of said budget compilation.

11. A budget compilation method according to claim 5, wherein each of said status flags represents information indicating a processing state of respective ones of said branch offices.

12. A budget compilation method according to claim 11, wherein said status flag information indicates a processed state or an unprocessed state, and said activated client selects a branch office which is in an unprocessed state as said branch office is determined at said fourth step.

13. A budget compilation method according to claim 11, wherein said status flag information indicates an under processing state, a processed state or an unprocessed state, and said activated client selects a branch office which is in an unprocessed state as said branch office determined at said fourth step.

14. A budget compilation system for performing budget compilation under distributed environments for branch offices, on a network having a server and a plurality of clients connected thereto, wherein:
   (a) said server comprises:
      scheduling file forming means for forming a scheduling file comprising identifiers and status flags corresponding to said identifiers; and
   (b) each client comprises:
      scheduling file transfer means for causing said scheduling file to be transferred from said server to said client, and for transferring a renewed scheduling file from said client to said server;
      branch office determining means for determining a branch office for which said client is to execute a budget compilation process, by referring to said identifiers and said status flags in said scheduling file and picking at least one branch office on the basis of its status flag; and flag renewing means for renewing in said scheduling file a status flag corresponding to a branch office thus determined by said branch office determining means.

15. A budget compilation scheduling method for a budget compilation system for performing budget compilation under distributed environments for branch offices, on a network having a server and a plurality of clients connected thereto, said method comprising:

a first step of forming a scheduling file comprising identifiers of said branch offices and status flags corresponding to said identifiers;

a second step of transferring said scheduling file from said server to an activated client;

a third step of determining in said activated client a branch office for which said activated client is to execute a budget compilation process, by referring to said identifiers and said status flags in said scheduling file and picking at least one branch office on the basis of its status flag; and a fourth step of renewing in said scheduling file a status flag corresponding to said branch office determined at said third step, and transferring a renewed scheduling file to said server from said activated client.

* * * * *